US006561303B2

(12) United States Patent
Pierce et al.

(10) Patent No.: US 6,561,303 B2
(45) Date of Patent: May 13, 2003

(54) TRACTION CONTROL SYSTEM (75) Inventors: Marty Pierce, North Royalton, OH (US); Matthew John Plas, Elyria, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 09/847,900

(22) Filed: May 2, 2001

(65) Prior Publication Data

US 2002/0023794 A1 Feb. 28, 2002

Related U.S. Application Data (60) Provisional application No. 60/201,096, filed on May 2, 2000.

(51) Int. Cl.$^7$ ................................................ B60K 17/00
(52) U.S. Cl. .......................................... 180/336; 74/514
(58) Field of Search ................................ 180/336, 306, 180/307, 305; 324/207.2; 74/473.16, 473.17, 478, 512, 513, 514; 56/14.7, 14.8, 10.9, 11.2, 11.9

(56) References Cited

U.S. PATENT DOCUMENTS

| 3,818,292 | A | * | 6/1974 | Berman ...................... 318/139 |
| 4,064,769 | A | * | 12/1977 | Amdall et al. ............... 477/115 |
| 4,156,369 | A | * | 5/1979 | Brown et al. ................. 74/474 |
| 4,178,518 | A | | 12/1979 | Phelps ......................... 180/65 |
| 4,226,120 | A | | 10/1980 | Nissl .......................... 73/517 |
| 4,237,752 | A | * | 12/1980 | Hildebrecht ................ 477/125 |
| 4,267,544 | A | | 5/1981 | Wiblin ......................... 338/32 |
| 4,311,051 | A | | 1/1982 | Eon et al. ..................... 73/517 |
| 4,364,022 | A | | 12/1982 | Melocik et al. ............... 338/32 |
| 4,526,255 | A | | 7/1985 | Hennessey et al. ......... 192/3.58 |
| 4,558,194 | A | * | 12/1985 | Wiblin .................... 200/61.89 |
| 4,590,909 | A | | 5/1986 | Heintz ........................ 123/360 |
| 4,677,958 | A | | 7/1987 | Gayler ........................ 123/585 |
| 4,883,037 | A | | 11/1989 | Mabee et al. ............... 123/399 |
| 5,115,186 | A | | 5/1992 | Reinartz et al. ............ 324/207 |
| 5,121,723 | A | | 6/1992 | Stepper et al. .............. 123/322 |
| 5,439,275 | A | | 8/1995 | Padula et al. ................. 303/3 |
| 5,509,496 | A | * | 4/1996 | Erickson et al. ............ 180/307 |
| 5,560,203 | A | | 10/1996 | Pollman ...................... 60/327 |
| 5,570,757 | A | * | 11/1996 | Courtwright et al. ....... 180/291 |
| 5,615,653 | A | | 4/1997 | Faletti et al. ................ 123/322 |
| 5,752,482 | A | | 5/1998 | Roettgen et al. ............ 123/322 |
| 5,793,175 | A | | 8/1998 | Journey ...................... 318/493 |
| 5,828,197 | A | | 10/1998 | Martin et al. ................ 318/567 |
| 5,838,259 | A | | 11/1998 | Tonkin ....................... 340/903 |
| 5,875,679 | A | | 3/1999 | Salecker et al. .............. 74/335 |
| 5,928,110 | A | | 7/1999 | Vornehm et al. ............ 477/166 |
| 6,131,380 | A | * | 10/2000 | Browning .................... 56/16.7 |
| 6,202,021 | B1 | * | 3/2001 | Kresse et al. ................. 701/93 |
| 6,318,208 | B1 | * | 11/2001 | Thongs, Jr. et al. .......... 74/513 |
| 6,357,232 | B1 | * | 3/2002 | Strashny ...................... 60/431 |
| 6,426,619 | B1 | * | 7/2002 | Pfaffenberger et al. .. 324/207.2 |

FOREIGN PATENT DOCUMENTS

EP          1217493      *   6/2002

* cited by examiner

Primary Examiner—Brian L. Johnson
Assistant Examiner—Bryan Fischmann
(74) Attorney, Agent, or Firm—Brouse McDowell; Roger D. Emerson; Timothy D. Bennett (57) ABSTRACT A foot pedal is pivotally connected to a bracket member wherein it operatively communicates with a Hall Effect sensing device for use in sensing the position of the foot pedal. A Hall Effect sensing device communicates with a control module, whereby the combination of the assembly operates to logically determine the position of the foot pedal with respect to driving the vehicle in the forward or reverse positions as well as a neutral position. The control module in conjunction with the Hall Effect sensing device is operable to engage various vehicle components such as reverse indicating lights and the like. Additionally, the Hall Effect sensing device and control module may be used to disengage a secondary power source or power take off from the engine when driving the vehicle in the reverse direction. Finally, an electromagnet is electrically communicated with the control module so that when engaged by the control modules, the electromagnet fixedly holds the foot pedal in place to serve as a cruise control function.

21 Claims, 5 Drawing Sheets

TRACTION CONTROL SYSTEM

This application claims priority from U.S. Provisional Application, Ser. No. 60/201,096, filed on May 2, 2000, titled RIDING LAWN TRACTOR.

BACKGROUND OF THE INVENTION

A. Field of Invention

The present invention relates to the art of Hall Effect sensors used in conjunction with the vehicle, and more specifically a vehicle accelerator mechanism.

B. Background

It is well-known in the art to provide mechanical linkages between a foot pedal and the throttle of an associated vehicle engine. As the foot pedal is depressed the mechanical linkage engages the engine to run at various operating levels. Over time the mechanical linkages wear creating inconsistent operating conditions. What is needed is a way of determining the position of the foot pedal that changes with usage of the vehicle.

SUMMARY OF THE INVENTION

It is an object of the present invention to provide a non-contact sensor for use with the vehicle accelerator pedal.

It is another object of the present invention to provide Hall Effect sensor for use with the vehicle.

It is still another object of the present invention to provide a cruise control mechanism utilizing an electromagnet.

It is yet another object of the present invention to utilize a Hall Effect sensor to inhibit the startup of the vehicle engine when the accelerator pedal is depressed.

It is still yet another object of the present invention to utilize a Hall Effect sensor to engage a vehicle backing light.

In accordance with the present invention, there is provided a Hall Effect sensor mechanically linked to an accelerator pedal of the vehicle. The Hall Effect sensor includes a sensor housing, a Hall Effect sensor member and a magnetic displacement member. The magnetic displacement member is slidable to be displaced relative to the Hall Effect sensor when the accelerator pedal is depressed by an operator. The Hall Effect sensor includes an electrical output that is responsive to the displacement of the displacement member. A control module is included that is electrically communicated with the output from the Hall Effect sensor. The control module may be communicated to backing lights and may be operatively connected to inhibit startup of the vehicle engine or inhibit power communicated to be power takeoff shaft. The Hall Effect sensor and control module may also include an electromagnet that is operatively juxtaposed to the accelerator pedal of the vehicle. A cruise switch may be operatively communicated with the control module so that when engaged, the control module sends an electric signal to the electromagnet fixing the position of the accelerator pedal.

Other objects and advantages of the invention will appear from the following detailed description of the preferred embodiment of the invention with reference being made to the accompanying drawings.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
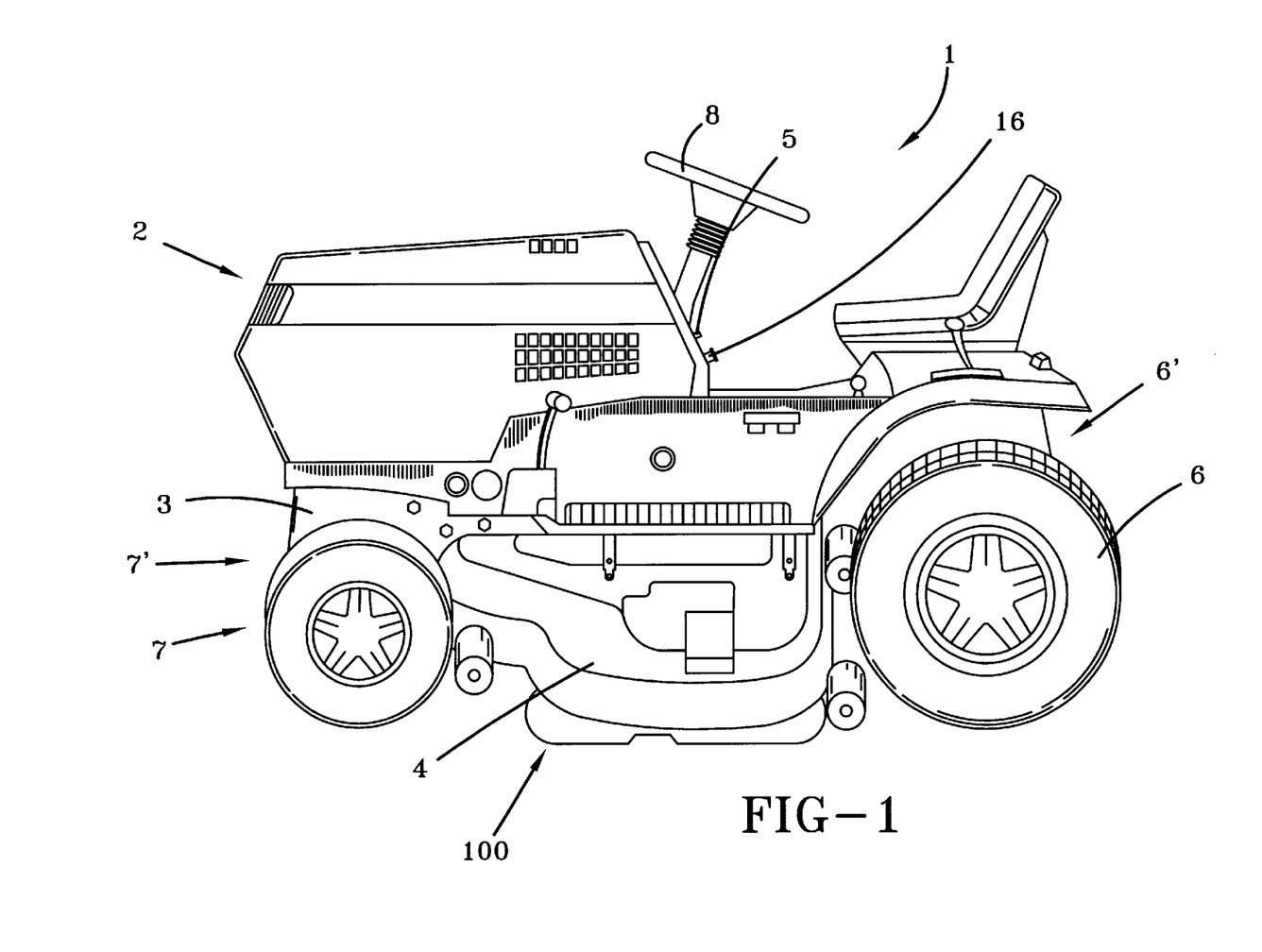
FIG. 1 is a side view of a vehicle.
Figure 2:
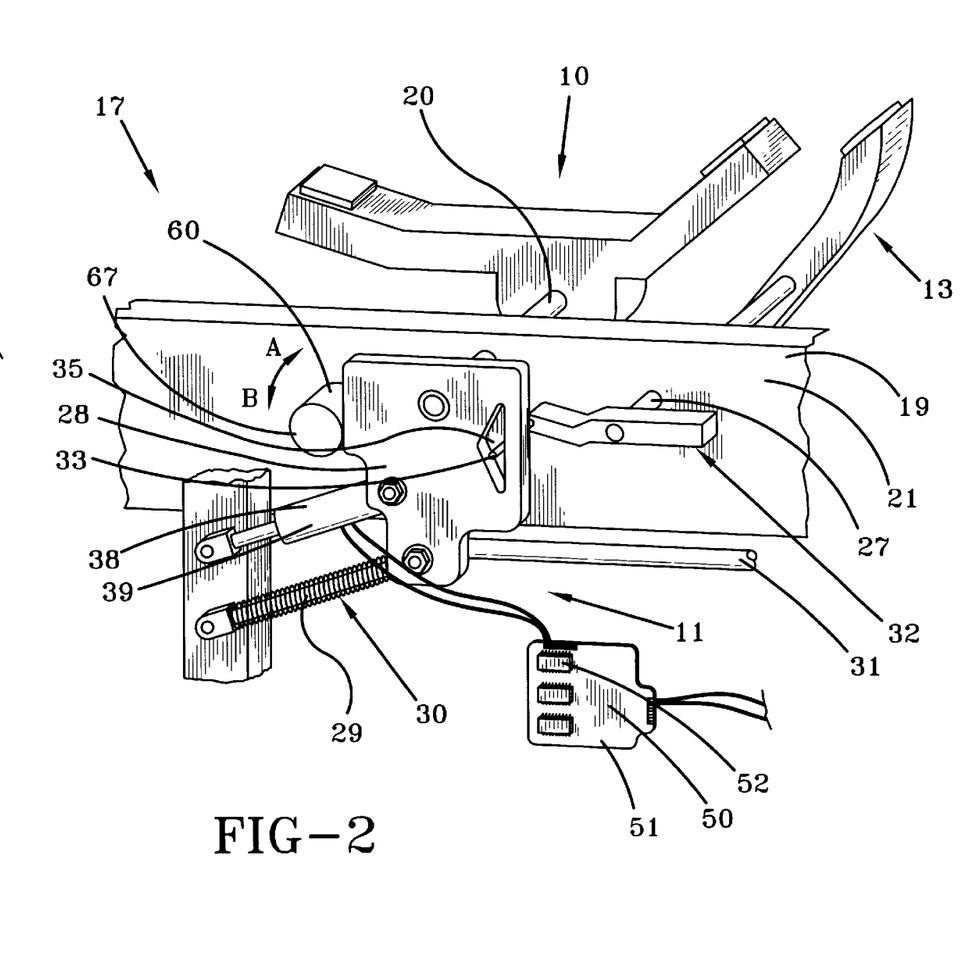
FIG. 2 is a perspective view of the foot pedal and mechanical linkages.

Referring now to the drawings wherein the showings are for purposes of illustrating a preferred embodiment of the invention only and not for purposes of limiting the same, FIGS. 1 and 2 depict a vehicle shown generally at 1. The vehicle 1 includes an engine 2 for use in providing power to drive wheels, 6 and 6'. The engine 2 is fixedly secured to a frame 3. An implement is provided, which in the preferred embodiment is a mower deck 4. However it is noted that any implement may be used in conjunction with the vehicle 1 as chosen with sound engineering judgment. The vehicle also includes front ground engaging wheels, 7 and 7'. The front ground engaging wheels, 7 and 7', are operatively attached to the frame so as to provide steering for the vehicle 1. A steering wheel 8 includes mechanical linkage, not shown, that is operatively attached to the grounding wheels, 7 and 7', for use in selectively steering the vehicle in a desired direction. The vehicle 1 includes a foot pedal 10 that is operatively attached to the engine 2 of the vehicle 1 via mechanical linkage 11. In this manner, the foot pedal 10 controls the level of revolutions per minute, RPMs, at which the engine 2 operates. A brake pedal 13 is pivotally attached to the frame 3 of the vehicle 1. Additionally, the brake pedal 13 is operatively connected to the vehicle brakes, not shown, in a manner well-known in the art. The brake pedal 13 is also connected to the mechanical linkage 11, such that when the brake pedal 13 is depressed, the brake pedal 13 returns the foot pedal 10 to a neutral position. The vehicle 1 also includes a key switch 5 that is communicated with the engine 2 for use in starting the engine 2. A cruise control device 17 is also included, wherein when engaged, the cruise control device 17 affixes the position of the foot pedal 10 so as to maintain the level at which the engine 2 operates when the cruise control device 17 is engaged.

Figure 3:
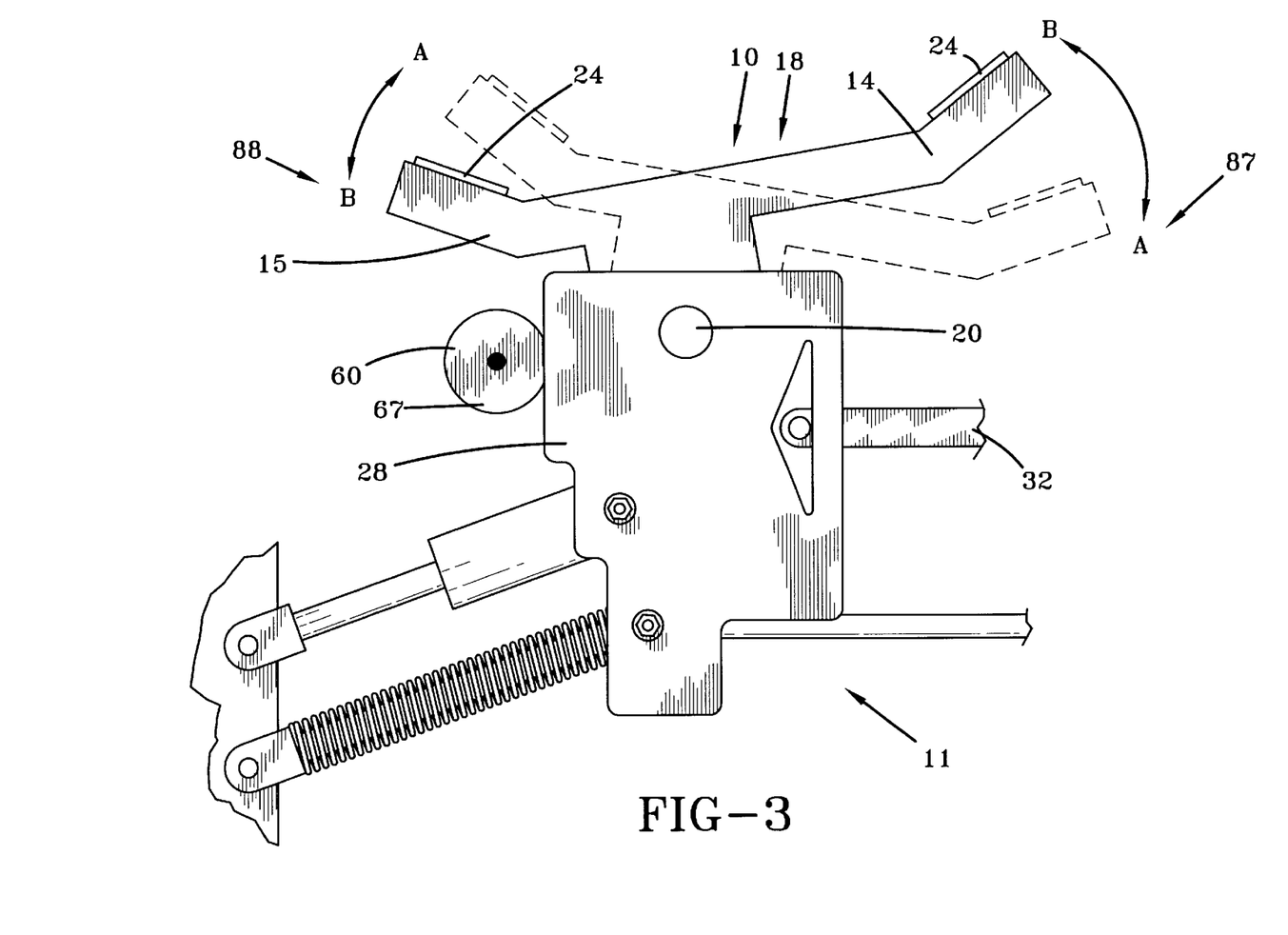
FIG. 3 is a side view of the foot pedal and mechanical linkages.

With reference to FIGS. 2 and 3, a foot pedal is shown generally at 10. The foot pedal 10 is connected to the engine 2 of the vehicle 1 so as to selectively engage the engine to run at different levels of revolutions per minute, RPMs. The foot pedal 10 is connected to the engine 2 via mechanical linkage 11, as will be discussed in a subsequent paragraph. In this manner, the foot pedal 10 serves as an engaging means 18 for use in engaging the engine 2. It is noted, that the foot pedal 10 is pivotally connected with respect to the frame 19 of the vehicle 1 via a pivoting rod 20. The pivoting rod 20 is fixedly attached at one end to the foot pedal 10 and extends through the frame member 21 for use in operatively connecting to the mechanical linkage 11, as will be discussed in a subsequent paragraph. The foot pedal 10 has first and second portions, 14 and 15. The first portion 14 of the foot pedal 10 and the second portions 15 of the foot pedal 10, each have footpad members 24. It is intended, that the operator of the vehicle 1 maneuver the foot pedal 10 by applying a force with the operators foot to either the first portion 14 or the second portion 15. By applying a force to the first portion 14 of the foot pedal 10, the foot pedal 10 will pivot in the direction indicated by the arrow designated A, as clearly shown in FIG. 3. Likewise, by applying a force to the second portions 15 of the foot pedal 10, the foot pedal 10 will pivot in the direction indicated by the arrow designated B. The connection of the foot pedal 10 with the mechanical linkage 11 is so configured so that when the foot pedal 10 is actuated or engaged in the A direction, the drive wheels, 6 and 6', will be driven in a first a direction. In the preferred embodiment, the first direction is a forward direction. Similarly, when the foot pedal 10 is depressed or engaged in the B direction, the drive wheels, 6 in 6', are driven in a second or reverse direction.

With reference now to FIG. 2, a brake pedal 13 is shown pivotally connected to the frame member 21. The brake pedal 13 includes a second pivoting rod 27 that extends through the frame 21 and operatively connects to the mechanical linkage 11. The brake pedal 13 includes further mechanical linkage, not shown, that subsequently connects to the braking mechanisms of the vehicle 1. In that braking mechanisms are well-known in the art, no further explanation will be offered at this time. It is noted at this point, that the brake pedal 13 has multiple functions, in that it serves to engage the braking mechanisms of the vehicle 1 and it functions to return the foot pedal 10 to a neutral position.

With reference is again to FIGS. 2 and 3, a bracket member 28 is shown disposed on an opposite side of the frame member 21 with respect to the foot pedal 10. The pivoting rod 20 is fixedly attached to the bracket member 28. In this manner, when the foot pedal 10 is depressed in either the A or B direction, the bracket member 28 is also pivoted or rotated in the same respective direction, A or B. In other words, the bracket member 28 pivots in synchronous with the foot pedal 10. A biasing means 29 is shown using a spring member 30, wherein the spring member 30 returns the bracket member 28, and consequently the foot pedal 10, to a null or neutral position. This neutral position is the default position of the foot pedal 10. The biasing means 29 may be any biasing means chosen with sound engineering judgment so as to return the bracket member 28, and the foot pedal 10, to the neutral position. It is noted at this point, that the neutral position of the foot pedal 10 may change overtime as the mechanical linkages wear. The throttle member 31 is shown fixedly attached at one end to the bracket member 28. The other end of the throttle member 31, not shown, is operatively connected to the engine 2 in a manner so as to engage the engine 2 in different levels of operating RPMs. A brake nulling linkage 32 is also shown operatively connecting the second pivoting rod 27 with the bracket member 28. The brake nulling linkage 32 includes a nulling pin 33 that is received into slot 35 of the bracket member 28. When the break pedal 13 is depressed, the brake nulling linkage 32 moves linearly relative to the pivoting of the break pedal 13 and resultantly forces the bracket member 28 into the neutral position.

Figure 4:
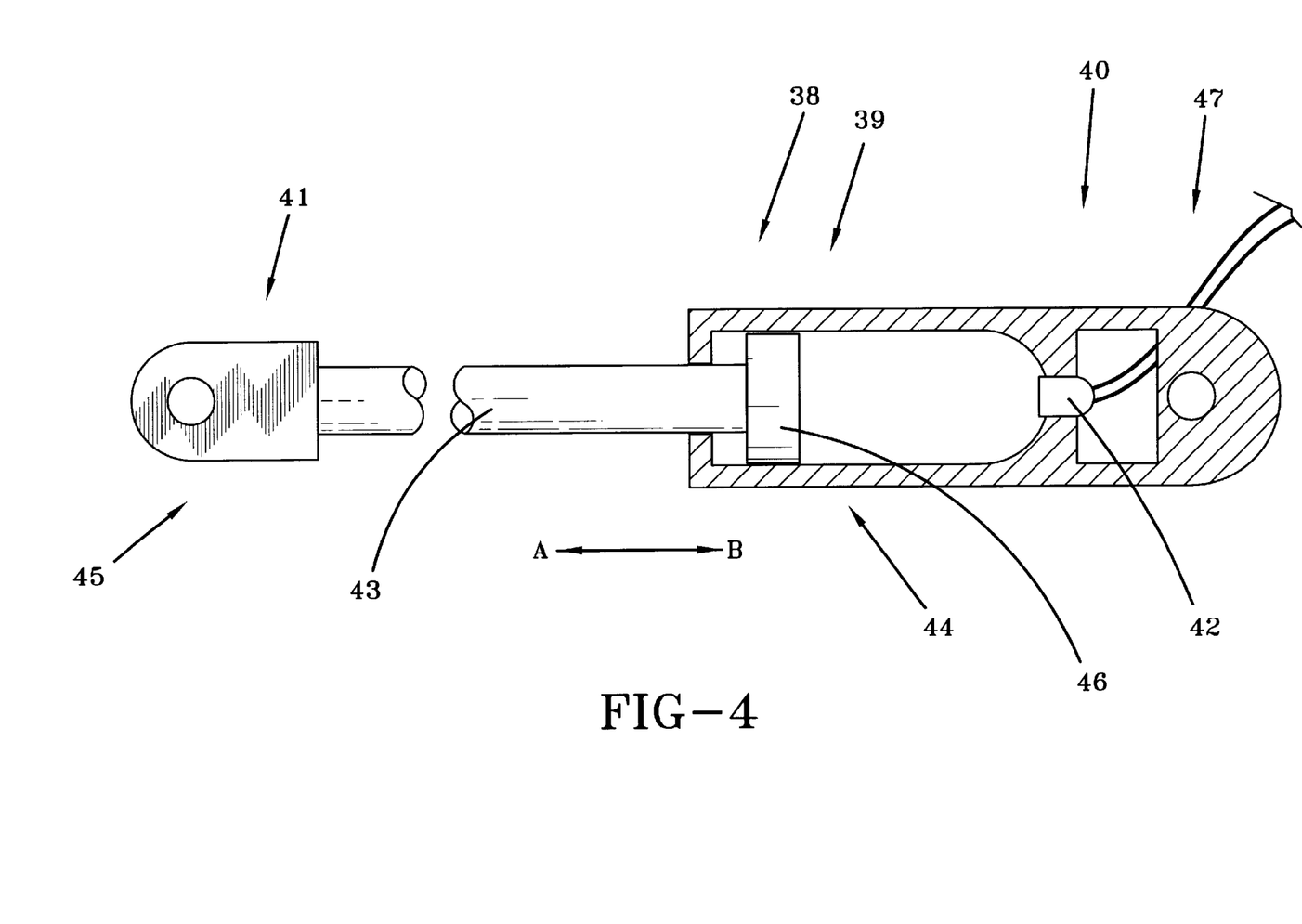
FIG. 4 is a partial cutaway view of the Hall Effect sensing means.

With reference not to FIGS. 2 and 4, a non-contact sensing means 38 is shown having first and second ends, 40 and 41. The first end 40 of the non-contact sening means 38 is pivotally attached to the bracket member 28. The second ends 41 of the non-contact sensing means 38 is pivotally attached to the frame 19. In this manner, when the bracket member 28 is rotated, by the action of the foot pedal 10, the first end 40 moves linearly with respect to the second end 41 of the non-contact sensing means 38. In other words, the first end 40 of the non-contact sensing means 38 is movable or slidable with respect to the second end 41 of the non-contact sensing means 38. In this way, when the foot pedal 10 is depressed in either the A or B direction, the first end 40 of the non-contact sensing means 38 moves proportionately to the degree that the foot pedal 10 is depressed with respect to the second end 41 of the non-contact sensing means 38. In the preferred embodiment, the non-contact sensing means 38 is a Hall Effect sensing means 39. The Hall Effect sensing means 39 includes a sensor member 42, and a displacement rod 43 that has first and second ends, 44 and 45. A magnetic member 46 is fixedly disposed on the first end 44 of the displacement rod 43. As the displacement rod 43 is moved in proportion to the degree that the foot pedal 10 is depressed, the sensor member 42 sends an electrical signal via conductors 47 responsive to the distance that the magnetic member 46 is from the sensor member 42. In this manner, the sensor member 42 can operatively determined the distance that the magnetic member 46 is from the sensor member 42. In that Hall Effect sensors and the operation thereof is well-known in the art, no further explanation will be offered at this point. It is noted that the second end 45 of the displacement of rod 43 is pivotally attached to the frame 19.

With reference now to FIGS. 2 and 4, a control module 50 is shown electrically communicated to the Hall Effect sensing means 39. The control module 50 may be comprised of a circuit board 51 and may include a microprocessor 52 for use in logically processing the signals from the Hall Effect sensing means 39. However any means of logically processing the signals of the Hall Effect sensing means 39 may be chosen with sound engineering judgment as is appropriate for use with Hall Effect sensors. It is expressly noted, that the control module 50 may be operable to distinguish relative degrees that the foot pedal 10 is depressed, via translation of the pivotal motion of the foot pedal 10 into linear motion of the Hall Effect sensing means 39. The control module 50 may also be operable to determine the rate of change of the foot pedal 10. However, any information available from the sensory feedback of the Hall Effect sensing means 39 may be logically processed and communicated by the control module 50 as chosen with sound engineering judgment.

Figure 5:
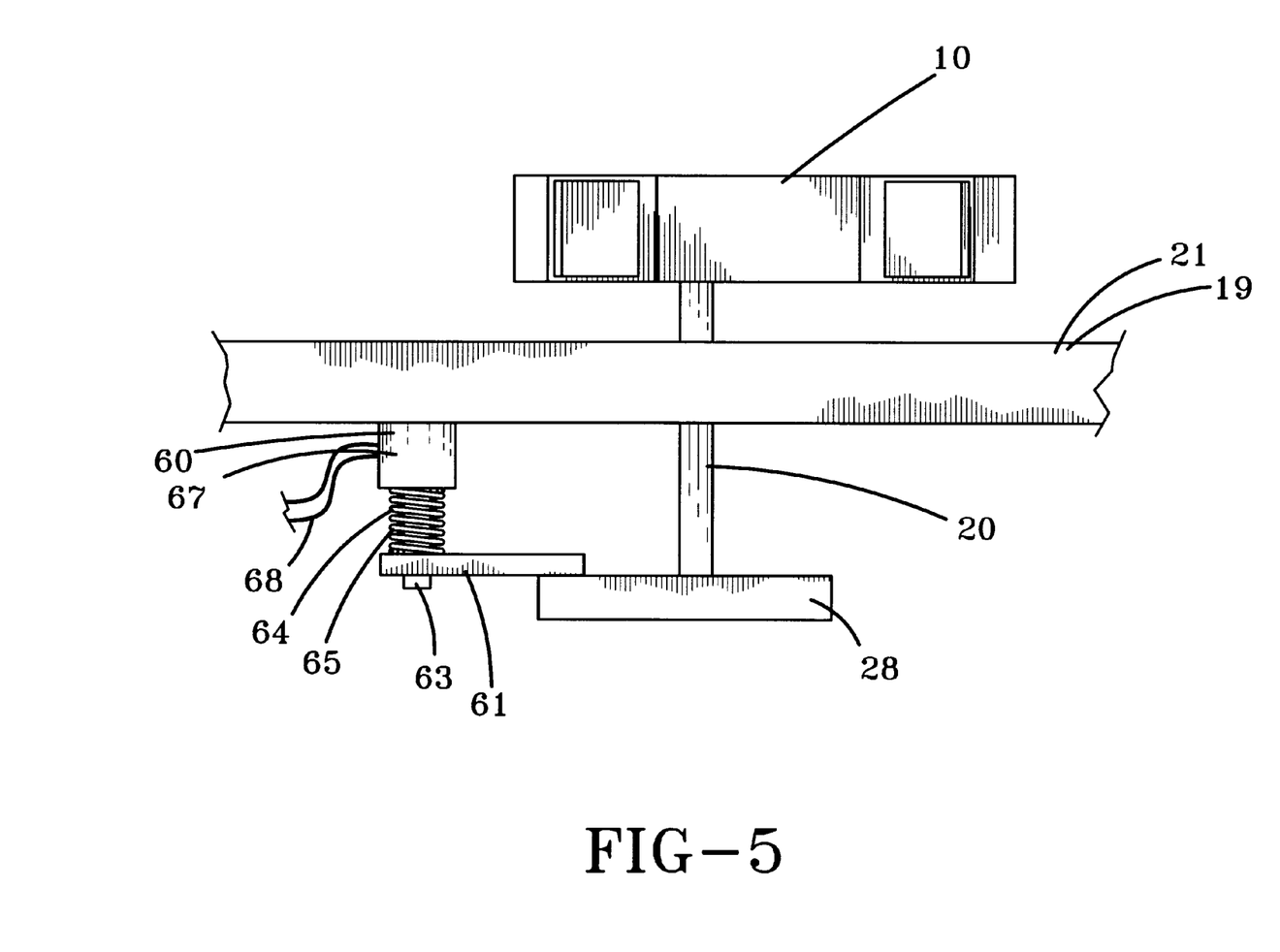
FIG. 5 is a top view of the foot pedal and mechanical linkages.

With reference now to FIGS. 2, 3 and 5, a magnetic member 60 is shown operatively attached to the bracket member 28. In the preferred embodiment, an extension member 61, extends from the bracket member 28 in a manner, most clearly show in FIG. 5. A pin member 63 rigidly protrudes from the extension member 61 in a direction toward the frame 19. The magnetic member 60 is received by the pin member 63 and is slidably connected thereto. A spring means 64 is operatively disposed between the magnetic member 60 and the extension member 61 so as to apply a force sufficient to maintain the juxtaposition of the magnetic member 60 to the frame 19. In the preferred embodiment, the spring means 64 is a coil spring 65. In the preferred embodiment the magnetic member 60 is an electromagnet 67. While it is noted that the magnetic member 60 is laterally slidable with respect to the bracket member 28, the magnetic member 60 is rigidly attached to the bracket member 28 with respect to rotational motion. The magnetic member 60 or the electromagnet 67 includes conductors 68 whereby electrical currents are communicated to engage the electromagnet 67. When the electromagnet 67 is electrically engaged, the electromagnet 67 and the rigidly attached bracket member 28 and consequently the foot pedal 10 are fixedly held in position by the magnetic attraction of the electromagnet 67 to the frame 19. In this manner, the electromagnet 67 serves as a cruise control device 17, which serves to hold the position of the foot pedal 10 in place without pressure are being applied to the foot pedal 10 by the operator. In the preferred embodiment, a cruise switch 16 disposed on the dashboard 71 of the vehicle functionally engages a cruise control device 17. When the cruise switch 16 engaged, a control signal is received by the control module; in turn, the control module 50 may electrically communicate current to engage the electromagnet 67. To disengage the cruise control device 17, during operation thereof, the operator may apply a force against the foot pedal 10 in either of the desired to directions, A or B overcoming the magnetic attractive forces between the electromagnet 67 and the frame 13, which would displace the displacement rod 43 and consequently signal the control module 50 that a change in position of the foot pedal 10 has occurred. Once the foot pedal 10 has been displaced by a threshold value, the control module 50 would disconnect current from the electromagnet 67 thereby disengaging the cruise control device 17. It is also noted, that the brake pedal 13 may be operatively connected to the control module 50 so that when the brake pedal is depressed the control module 50 would disengage the cruise control device 17. Additionally disengagement of the cruise switch 16 may likewise signal the control module 50 to disengage the cruise control device 17.

With continued reference to FIGS. 1 through 5, a further description of the operation of the Hall Effect sensing means 39 in conjunction with the various components of the vehicle 1 will now be discussed. The foot pedal 10 in having first and second portions 14 and 15 respectively is operable, as previously discussed, to be depressed in a first direction A and a second direction B. When the foot pedal 10 is depressed in the A direction, the engine 2 or prime mover drives to the ground engaging wheels 6 and 6' in a first direction, which in the preferred embodiment is a foreword direction of travel. Likewise when the foot pedal 10 is depressed in the B direction, the prime mover drives the ground engaging wheels 6 and 6' in a second direction, which in the preferred embodiment is a reverse direction of travel. It is contemplated, that the engine or prime mover may be an hydrostatic drive system. However any means of driving the ground engaging wheels in a manner as previously described may be chosen with sound engineering judgment. The foot pedal 10 may be engaged into a first position. In the preferred embodiment, the first position is a first limiting position 87. The first limiting position 87 is the limit at which the foot pedal 10 may be depressed in the A direction. Likewise the foot pedal 10 may be engaged into a second position, which may be a second limiting position 88 in the B direction. Additionally, the foot pedal 10 as previously described may be biased by the biasing means 29 into a neutral position. In the neutral position, the prime mover is substantially not engaged to drive the ground engaging wheels 6 and 6' in either of the first or second directions. In other words in the neutral position of the foot pedal 10 the ground engaging wheels 6 and 6' are not being driven. It is noted at this point, that the neutral position of the foot pedal 10 may change as the mechanical linkages and components of the mechanism wear over time. Consequently the control module 50 may logically store the position of the foot pedal 10 when the vehicle 1 is braked or when the vehicle is turned off. In this manner, the neutral position of the foot pedal 10 may change and consequently the control module 50 logically stores the current neutral position for use during the next operation of the vehicle 1. Storage of the current neutral position may be accomplished because the control module is operatively communicated to both the brake pedal and the key switch 14 of the vehicle, wherein when the vehicle is either braked or turned off a signal is received by the control module to logically store the current position of the foot pedal as the new neutral position. In continuation, the degree that the operator depresses the foot pedal 10 in the A direction determines the rates or the level of power that the ground engaging wheels 6 and 6' are driven in the forward direction. In other words, depressing the foot pedal 10 in the A direction by a small amount would cause of the prime mover to drive at a commensurate level. Likewise depressing the foot pedal 10 in the A direction by the maximum amount, which consequently would result in depressing the foot pedal 10 all the way to the first limiting position 87, would cause the prime mover to be driven at a maximum amount. It is noted that the foot pedal 10 and its configuration with respect to operating the or prime mover is analog in nature or in other words is infinitely variable between the neutral position and the first limiting position 87 or second limiting position 88. In a similar matter, when the foot pedal 10 is depressed in the B direction the prime mover is driven in the reverse direction by an amount commensurate with a degree that the foot pedal 10 was depressed.

In that the Hall Effect sensing means 39 is operatively connected to the foot pedal 10 so as to precisely determine the position and change in position of the foot pedal 10 when operated, the Hall Effect sensing means is operable to output an electrical signal responsive to the degree that the foot pedal 10 has been engaged or depressed. Subsequently, in that the output of the Hall Effect sensing means 39, via sensing member 42, is electrically communicated to the controlling means 50, the controlling means 50 may perform various operations based upon the sensor inputs. In the preferred embodiment, the vehicle 1 has an indicating means, which may be reversing lights 90. When the foot pedal 10 is depressed in the B direction, during operation of the vehicle 1, the control module 50 is operable to determine that the foot pedal 10 has been engaged out of the neutral position and into a second position, which drives the ground engaging wheels 6 and 6' in the reverse direction. In other words when the foot pedal 10 is depressed so that the driven state of the vehicle 1 is changed from the neutral or substantially non-driven state to a reverse driven state, the control module 50 determines the change of driven state of the vehicle 1 and turns on the reversing lights 90. Consequently when the foot pedal 10 changes from the reverse driven state to the neutral position, the control module 50 determines the change of driven state and turns off the reversing lights 90. It is contemplated in an alternate embodiment, that during the above-mentioned change of state that the control module is also operatively communicated to a second power output or power take off 100. The power take off or PTO 100 may be operatively communicated to the engine 2 or prime mover wherein power from the engine is communicated to a PTO 100 shaft, not shown. In this embodiment, when the foot pedal 10 is depressed in the B direction, the control module 50, being operatively communicated to the power takeoff 100, would disconnect power from being communicated from the engine 2 to the power takeoff shaft 100.

A key switch 5, as shown in FIG. 1 is communicated so as to turn on the engine 2. When the key switch 5 is engaged from an "off" position to an "on" position, the engine 2 is turned on. An alternate embodiment is contemplated, wherein when the foot pedal 10 is depressed in either the A or B directions, the control module 50, being operatively communicated to the key switch 5, inhibits the startup of the engine 2 until the foot pedal 10 is returned to the neutral position.

While specific embodiments of the invention have been described and illustrated, it is to be understood that these embodiments are provided by way of example only and that the invention is not to be construed as being limited thereto but only by proper scope of the following claims.

We claim:

1. A vehicle, comprising:

a frame;

at least a first ground engaging wheel rotatably connected to said frame;

an engine fixedly attached to said frame, said engine operatively connected to said first ground engaging wheel to drive said first ground engaging wheel in a first and second direction;

an engaging means operatively communicated to said engine for use in selectively driving said engine, said engaging means being selectively positioned between at least a first, second, and neutral position;

a non-contacting sensing means operatively communicated to said engaging means for use in sensing said first and second positions of said engaging means;

wherein when said engaging means is positioned into said first position said first ground engaging wheel is driven in a forward direction and when said engaging means is positioned into said second position said first ground engaging wheel is driven in a reverse direction and when said engaging means is positioned in said neutral position said first ground engaging wheel is substantially not driven in either of said forward or reverse directions;

wherein said engine includes a power take off shaft, said power take off shaft being operatively communicated to receive output power from said engine, and, wherein when said engaging means is positioned into said second position said output power from said engine is disconnected from said power take off shaft.

2. The vehicle of claim 1, wherein said engaging means is a pedal member, wherein said first and second positions are at least first and second limiting positions, and, wherein said pedal member is infinitely variable between said first limiting and neutral and second limiting positions.

3. The vehicle of claim 2, wherein said pedal member comprises:

biasing means for use in biasing said pedal member into said neutral position.

4. The vehicle of claim 3, further comprising:

indicating means for use in selectively indicating when said vehicle is driven in said reverse direction, said indicating means operatively communicated to said engaging means, and, wherein when said engaging means is adjusted into said second position said indicating means is activated to indicate that said vehicle is driven in said reverse direction.

5. The vehicle of claim 1, wherein said non-contacting sensing means comprises:

a sensor housing operatively attached to said frame;

a non-contacting sensor member fixedly mounted to said sensor housing;

a displacement member operatively movably attached with respect to said sensor housing, wherein when said engaging means is adjusted said displacement member is responsively displaced relative to said non-contacting sensor member; and, wherein said non-contacting sensor member is operable to provide at least a first output responsive to said displacement of said displacement member.

6. The vehicle of claim 5, wherein said non-contacting sensor member is a Hall Effect sensor member, and, wherein said displacement member includes a magnet.

7. The vehicle of claim 6, further comprising:

a control module operatively attached to said frame, said control module operatively communicated to receive said at least a first output from said non-contacting sensor member.

8. A vehicle of claim 2, wherein said control module is operatively communicated to said engine for use in selectively inhibiting said engine from being turned on; and, wherein when said engaging means is selectively adjusted in either of said first and second positions said control module inhibits said engine from being turned on.

9. The vehicle of claim 1, further comprising:

a vehicle implement operatively attached to said frame, wherein said vehicle implement is in operable communication with said power take off shaft.

10. The vehicle of claim 9, wherein said work implement is a mower deck.

11. A vehicle, comprising:

a frame;

at least a first ground engaging wheel rotatably connected to said frame;

an engine fixedly attached to said frame, said engine operatively connected to said first ground engaging wheel to drive said first ground engaging wheel in a first and second direction;

an engaging means operatively communicated to said engine for use in selectively driving said engine, said engaging means being selectively positioned between at least a first, second, and neutral position;

a non-contacting sensing means operatively communicated to said engaging means for use in sensing said first and second positions of said engaging means;

wherein said engine includes a power take off shaft, said power take off shaft being operatively communicated to receive output power from said engine, and, wherein when said engaging means is positioned into said second position said output power from said engine is disconnected from said power take off shaft.

12. The vehicle of claim 11, wherein when said engaging means is positioned into said first position said first ground engaging wheel is driven in a forward direction and when said engaging means is positioned into said second position said first ground engaging wheel is driven in a reverse direction and when said engaging means is positioned in said neutral position said first ground engaging wheel is substantially not driven in either of said forward or reverse directions.

13. The vehicle of claim 12, wherein said engaging means is a pedal member, wherein said first and second positions are at least first and second limiting positions, and, wherein said pedal member is infinitely variable between said first limiting and neutral and second limiting positions.

14. The vehicle of claim 13, wherein said pedal member comprises:

biasing means for use in biasing said pedal member into said neutral position.

15. The vehicle of claim 12, further comprising:

indicating means for use in selectively indicating when said vehicle is driven in said reverse direction, said indicating means operatively communicated to said engaging means, and, wherein when said engaging means is adjusted into said second position said indicating means is activated to indicate that said vehicle is driven in said reverse direction.

16. The vehicle of claim 12, wherein said non-contacting sensing means comprises:

a sensor housing operatively attached to said frame;

a non-contacting sensor member fixedly mounted to said sensor housing;

a displacement member operatively movably attached with respect to said sensor housing, wherein when said engaging means is adjusted said displacement member is responsively displaced relative to said non-contacting sensor member; and, wherein said non-contacting sensor member is operable to provide at least a first output responsive to said displacement of said displacement member.

17. The vehicle of claim 16, wherein said non-contacting sensor member is a Hall Effect sensor member, and, wherein said displacement member includes a magnet.

18. The vehicle of claim 17, further comprising:

a control module operatively attached to said frame, said control module operatively communicated to receive said at least a first output from said non-contacting sensor member.

19. A vehicle of claim 18, wherein said control module is operatively communicated to said engine for use in selectively inhibiting said engine from being turned on; and, wherein when said engaging means is selectively adjusted in either of said first and second positions said control module inhibits said engine from being turned on.

20. The vehicle of claim 12, further comprising:

a vehicle implement operatively attached to said frame, wherein said vehicle implement is in operable communication with said power take off shaft.

21. The vehicle of claim 20, wherein said work implement is a mower deck.

* * * * *